Jan. 14, 1958   E. SION   2,819,614
HYGROMETER
Filed Jan. 27, 1954
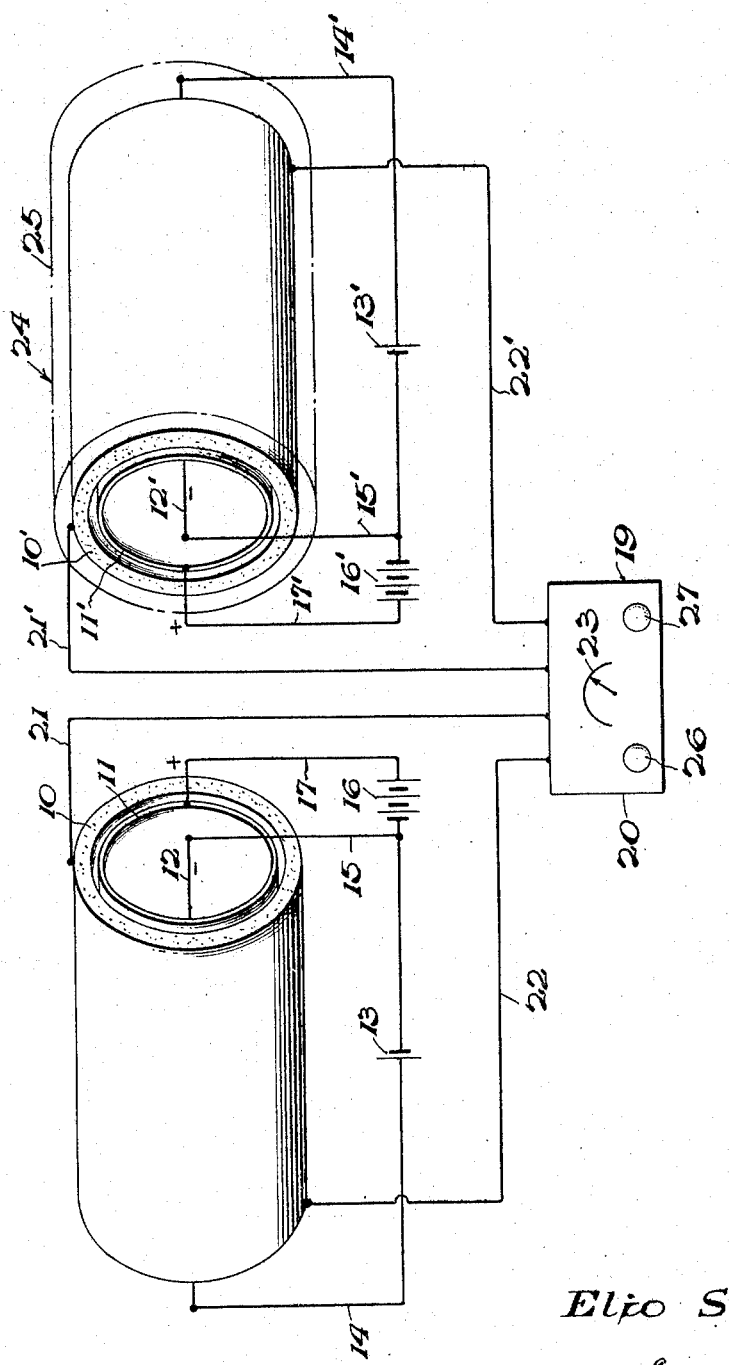
INVENTOR
Elio Sion.
BY K.G.Doub
ATTORNEY

2,819,614

HYGROMETER

Elio Sion, Baltimore, Md., assignor to Bendix Aviation Corporation, Baltimore, Md., a corporation of Delaware Application January 27, 1954, Serial No. 406,390

9 Claims. (Cl. 73—335)

This invention relates to a device for detecting and measuring or indicating the degree of moisture in the atmosphere, for monitoring mixed gases, detecting impurities in a gas, and analogous functions involving comparison and analyzation of certain types of gases.

Hygrometers utilizing an electric resistance element or conductor which varies in relation to changes in temperature and incorporating means for heating the element as a function of the moisture content of the air are well adapted for various uses and installations. However, an objection to such instruments as heretofore devised, is the difficulty in obtaining variations in voltage and current flow of sufficient magnitude to produce the required response without involving relatively expensive and cumbersome amplifying means, ofttimes unsuitable for the system in which the instrument is to be installed.

An object of the subject invention, therefore, is to provide an improved hygrometer or analogous device operating on the change in electrical resistance principle in which changes in temperature in response to changes in moisture content of the gas or air undergoing treatment will produce proportionate changes in an associated resistance or conductor of relatively great magnitude.

Another object of the invention is to provide an improved hygrometer or like gas measuring or monitoring device which operates on the principle of heat transfer and electrostriction.

The foregoing and other objects and advantages will become apparent in view of the following description taken in conjunction with the drawing, wherein the single figure illustrates schematically a hygrometer embodying the features of the invention.

Referring to the drawing, a resistance element such as an electrical semi-conductor having a high negative temperature coefficient of resistance is indicated at 10. In the present instance, the element 10 is of that type commonly termed a thermistor; it is made of material having a high negative coefficient of resistance, i. e., as its temperature increases its electrical resistance decreases. Such elements may be fabricated in accordance with the teaching of the U. S. patent to Sanborn, No. 2,590,894. Preferably the thermistor element 10 is of hollow or tubular form, to obtain maximum exposed surface area in a minimum of space.

Located within the tubular resistance element 10 is an electrode in the form of a metal cylinder or sleeve 11, which is suitably electrically insulated from the surrounding tubular element 10, the insulation in the present instance being provided by an air space therebetween. This metal cylinder 11 functions both as an electrical anode and a heat radiating means in a manner to be described.

Projecting axially through the sleeve 11 is a combined heating and polarizing electrode 12, which may consist of a suitable length and gauge of wire made of platinum or other material which will give off heat when an electrical current is passed therethrough. The electrode 12 is put in circuit with a suitable source of potential, here shown as a battery 13, by wires 14 and 15. Also, the metal sleeve or cylinder 11 is put in circuit with a suitable source of potential, here shown as a battery 16, by wire 17. To effect polarization and electrostriction of the moisture molecules, the electrode 12 and sleeve or cylinder 11 are subjected to potentials of opposite polarity. Since in this instance, the sleeve 11 serves as an anode, it is subjected to a positive potential and the electrode 12 to a negative potential.

The outer tubular thermistor 10 is put in circuit with a suitable indicating instrument 20 by wires 21 and 22. The indicator 20 may incorporate a meter 23, which may be of the moving coil or D'Arsonval type having a dial calibrated in units of moisture content proportional to changes in resistance across the tubular thermistor 10.

A suitable calibrating and reference unit, generally indicated at 24, is preferably associated with the main sensing unit, the unit 24 being similar in all respects to the main sensing unit except that it is enclosed in a suitable hermetic seal 25. Parts of the unit 24 which correspond to like parts of the main unit are designated by similar reference numerals with the addition of a prime ('). If the device is to be used as a hygrometer or for measuring the moisture content of the ambient air, then the unit 24 would be charged with air at some given moisture content; for example, the moisture content could approximate unity. The indicator 20 is shown provided with a pair of control knobs 26 and 27, the knob 26 being used to switch the indicator over to the main sensing unit and the knob 27 being used to switch the indicator over to the calibrating and reference unit 24. In cases where it is desired to have the meter 23 record or indicate moisture content on the basis of the effective difference between the main unit and the reference unit, the conventional balancing bridge network may be incorporated in the meter circuit.

Operation

When the electrodes 11 and 12 are subjected to potentials of opposite polarity, an electric field is set up in the space therebetween, which space in this instance is the passage defined by the cylindrical electrode 11. The electrode 12 will heat up since there will be a flow of current therethrough from battery 13. The field strength will be concentrated in the immediate region of the heater electrode 12, since in this region the lines of force are radiating from a negative pole of small diameter towards a positive pole of considerably greater diameter. Any molecules of moisture in the field will be polarized, and the charges in each molecule will tend to move towards the oppositely charged electrodes; and this action causes the molecules to stretch or produces "electrostriction." This stretching phenomena will take place regardless of which electrode is positive and which is negative. The moisture particles thus polarized and attracted by the density of the field around the wire 12 are displaced and other particles rush in to take their place, and this sets up a turbulent action throughout the passage, which accelerates the transfer of heat by conduction from the wire 12 to the cylinder 11. As the water molecules or vapor in the air being measured increase, there will be a corresponding increase in the thermal conductivity of the air and a like increase in the temperature of the cylinder 11, and hence the amount of heat passing through the latter cylinder will be a function of the moisture content of the air; and this change or increase in temperature will be communicated to the semiconductor or thermistor 10. Since the thermistor 10 has a relatively high negative temperature coefficient of resistance, it in effect acts as an amplifier which supplies ample D. C. voltage for operating the indicator meter without requiring electronic amplifiers and converters.

Since the moisture content of the air in the hermetically sealed unit 24 remains substantially constant, the latter serves as a convenient reference for the main or actual sensing unit, the effective difference between the responses of the two units representing the degree of moisture content in the ambient air.

While the device is shown as being primarily adapted for measuring the moisture content of ambient air, yet it will be obvious to those having a knowledge of the art that it could be used for monitoring gases, gas mixtures, and for indicating and measuring the content of moisture and other matter responsive to changes in heat and electrical potential. In cases where gases other than air are being subjected to treatment, the calibrating and reference unit 24 would be charged with a gas similar to that undergoing treatment.

While the device embodying the invention has been shown primarily schematically, such showing taken with the accompanying description is amply sufficient to enable those skilled in the art to adapt the invention to various installations without departing from the spirit or scope of the invention.

What is claimed and desired to be secured by United States Letters Patent is:

1. In a device of the type specified, a cylindrical electrical semi-conductor comprised of material having the characteristics of a change in resistance responsive to a change in temperature, a cylindrical metallic sleeve telescoped within said semi-conductor and electrically insulated therefrom, a combined electrical heating and polarizing element located axially of said sleeve, means for impressing potentials of opposite polarity on said sleeve and element, means for energizing the said element, and an electrical measuring or indicating instrument having an associated circuit incorporating said semi-conductor.

2. In a device of the type specified, a hollow cylindrical electrical semi-conductor having the characteristic of a change in resistance in response to a change in temperature, a metallic sleeve telescoped within said semi-conductor having its outer surface spaced therefrom, a combined electrical heating and polarizing element located axially of said sleeve, means for impressing potentials of opposite polarity on said sleeve and element, means for energizing the said element, and an electrical indicating or measuring instrument having an associated electrical circuit incorporating said semi-conductor.

3. In a device of the type specified, a hollow cylinder comprised of material having a high negative temperature coefficient of resistance, a hollow metallic sleeve telescoped within said cylinder and electrically spaced therefrom, a combined electrical heating and polarizing element projected axially of said sleeve, means for impressing potentials of opposite polarity on said sleeve and element, means for energizing the said element, and an electrically indicating or measuring instrument having an associated electrical circuit incorporating said cylinder.

4. In a device of the type specified, a sensing unit comprising an electrical semi-conductor having the characteristics of a change in resistance in response to a change in temperature, a combined heating and polarizing element for gases in the region of said semi-conductor, a member capable of operating as an electrode interposed between said heating element and said semi-conductor and electrically insulated from said semi-conductor, means for impressing potentials of opposite polarity on said heating and polarizing element and on said member, means for energizing the said element, a reference unit associated with said sensing unit and being of substantially the same construction as the sensing unit except that the reference unit is provided with a hermetic seal for sealing a gas therein having a given analysis to serve as a reference, and an electrical indicating instrument having an associated electrical circuit incorporating the electrical semi-conductors of the sensing unit and the reference unit.

5. A device as claimed in claim 4, wherein said electrical semi-conductors and said electrode members are of cylindrical form with the electrode members telescoped in the associated semi-conductors and electrically spaced therefrom, said heating and polarizing elements being projected axially through their associated cylindrical electrode members.

6. In a device of the type specified, an electrical semi-conductor having the characteristic of a change in resistance in response to a change in temperature, a combined heating and polarizing element located in the region of said conductor, means for energizing the said element, an electrode member interposed between said element and said semi-conductor and electrically insulated from the latter, said electrode member being in heat transfer relation to said semi-conductor, means for subjecting said electrode member to a potential having a polarity which is positive with respect to the potential of said heating element, and an indicating instrument having an associated electrical circuit incorporating said semi-conductor.

7. In a device of the type specified, an electrical semi-conductor in the form of a hollow cylinder comprised of material having the characteristic of a change in resistance responsive to a change in temperature, a first electrode in the form of a cylindrical metallic sleeve telescoped within said semi-conductor and electrically insulated therefrom, a second combined heating and polarizing electrode located axially of said sleeve, means for energizing said second electrode, said first-named electrode being in heat-transfer relation to said semi-conductor, means for subjecting said first electrode to a potential having a polarity which is positive with respect to the polarity of said second electrode, and an indicating instrument having an associated electrical circuit incorporating said semi-conductor.

8. In a device of the type specified, an electrical semi-conductor having the characteristic of a change in resistance in response to a change in temperature, a heating element for gases in the region of said semi-conductor, means for energizing said heating element, a member capable of operating as an electrode interposed between said heating element and said semi-conductor and electrically insulated from said semi-conductor, said member being in heat-transfer relation to said semi-conductor, means for impressing potentials of opposite polarity on said heating element and on said member, and an electrical indicating instrument having an associated electrical circuit incorporating said semi-conductor.

9. In a device of the type specified, an electrical semi-conductor having the characteristic of a change in resistance in response to a change in temperature, a metallic member capable of functioning as an electrode having a surface area arranged in proximity to said semi-conductor and electrically spaced therefrom, a combined heating and polarizing electrode located in proximity to said metallic member, means for energizing said latter electrode, means for impressing potentials of opposite polarity on said electrodes, and an electrical indicating or measuring instrument having an associated circuit incorporating said semi-conductor.

References Cited in the file of this patent

UNITED STATES PATENTS

| 2,649,707 | Donath et al. | Aug. 25, 1953 |
| 2,671,334 | Gunn | Mar. 9, 1954 |

FOREIGN PATENTS

| 648,367 | Great Britain | Jan. 3, 1951 |